(12) United States Patent
Catreux-Erceg et al.

(10) Patent No.: US 7,876,808 B2
(45) Date of Patent: Jan. 25, 2011

(54) METHOD AND APPARATUS FOR ADAPTIVE NOISE AND/OR SIGNAL FILTERING IN AN HSDPA CHANNEL QUALITY INDICATOR (CQI) SELECTION

(75) Inventors: Severine Catreux-Erceg, Cardiff, CA (US); Li Fung Chang, Holmdel, NJ (US)

(73) Assignee: Broadcom Corp.

( * ) Notice: Subject to any disclaimer, the term of this patent is extended or adjusted under 35 U.S.C. 154(b) by 817 days.

(21) Appl. No.: 11/565,448

(22) Filed: Nov. 30, 2006

(65) Prior Publication Data
US 2008/0130711 A1 Jun. 5, 2008

(51) Int. Cl.
*H04B 1/00* (2006.01)
(52) U.S. Cl. .................. 375/140; 375/147; 375/229; 375/232; 375/316
(58) Field of Classification Search .......... 375/147, 375/229, 232, 316, 140
See application file for complete search history.

(56) References Cited

U.S. PATENT DOCUMENTS 6,633,894 B1 * 10/2003 Cole ..................... 708/300
6,983,125 B2 * 1/2006 Smee et al. ................. 455/63.1
2003/0198285 A1 * 10/2003 Qi et al. ..................... 375/148

FOREIGN PATENT DOCUMENTS

| CN | 1589555 | 3/2005 |
| KR | 10-2003-0060387 A | 7/2003 |
| KR | 10-2004-0005339 A | 1/2004 |
| WO | WO 2006011078 | 2/2006 |

* cited by examiner

*Primary Examiner*—Ted M Wang
(74) *Attorney, Agent, or Firm*—McAndrews, Held & Malloy, Ltd.

(57) ABSTRACT

Methods and systems for processing signals in a wireless communication system are disclosed. Aspects of the method may include estimating at a receiver, a rate at which a communication channel changes. A length of a filter used to average a noise power estimate and/or a signal power estimate may be adaptively changed based on the estimation of the rate at which the communication channel changes. The communication channel may comprise a common pilot channel (CPICH). At least a portion of a wireless signal received via the communication channel may be descrambled at the receiver to generate a plurality of descrambled bits. At least a portion of the plurality of descrambled bits may be accumulated to generate at least one in-phase (I) component and at least one quadrature (Q) component.

20 Claims, 10 Drawing Sheets

100c

| CQI value | Transport Block Size | Number of HS-PDSCH | Modulation | Reference power adjustment Δ | $N_{IR}$ | $X_{RV}$ |
|---|---|---|---|---|---|---|
| 0 | N/A | Out of range | | | | |
| 1 | 137 | 1 | QPSK | 0 | 9600 | 0 |
| 2 | 173 | 1 | QPSK | 0 | | |
| 3 | 233 | 1 | QPSK | 0 | | |
| 4 | 317 | 1 | QPSK | 0 | | |
| 5 | 377 | 1 | QPSK | 0 | | |
| 6 | 461 | 1 | QPSK | 0 | | |
| 7 | 650 | 2 | QPSK | 0 | | |
| 8 | 792 | 2 | QPSK | 0 | | |
| 9 | 931 | 2 | QPSK | 0 | | |
| 10 | 1262 | 3 | QPSK | 0 | | |
| 11 | 1483 | 3 | QPSK | 0 | | |
| 12 | 1742 | 3 | QPSK | 0 | | |
| 13 | 2279 | 4 | QPSK | 0 | | |
| 14 | 2583 | 4 | QPSK | 0 | | |
| 15 | 3319 | 5 | QPSK | 0 | | |
| 16 | 3565 | 5 | 16-QAM | 0 | | |
| 17 | 4189 | 5 | 16-QAM | 0 | | |
| 18 | 4664 | 5 | 16-QAM | 0 | | |
| 19 | 5287 | 5 | 16-QAM | 0 | | |
| 20 | 5887 | 5 | 16-QAM | 0 | | |
| 21 | 6554 | 5 | 16-QAM | 0 | | |
| 22 | 7168 | 5 | 16-QAM | 0 | | |
| 23 | 7168 | 5 | 16-QAM | -1 | | |
| 24 | 7168 | 5 | 16-QAM | -2 | | |
| 25 | 7168 | 5 | 16-QAM | -3 | | |
| 26 | 7168 | 5 | 16-QAM | -4 | | |
| 27 | 7168 | 5 | 16-QAM | -5 | | |
| 28 | 7168 | 5 | 16-QAM | -6 | | |
| 29 | 7168 | 5 | 16-QAM | -7 | | |
| 30 | 7168 | 5 | 16-QAM | -8 | | |

FIG. 1C

METHOD AND APPARATUS FOR ADAPTIVE NOISE AND/OR SIGNAL FILTERING IN AN HSDPA CHANNEL QUALITY INDICATOR (CQI) SELECTION

CROSS-REFERENCE TO RELATED APPLICATIONS/INCORPORATION BY REFERENCE

This application makes reference to:

U.S. application Ser. No. 11/565,438, filed on Nov. 30, 2006.

The above state application is hereby incorporated herein by reference in its entirety.

FIELD OF THE INVENTION

Certain embodiments of the invention relate to the processing of wireless communication signals. More specifically, certain embodiments of the invention relate to a method and apparatus for adaptive noise and/or signal filtering in an HSDPA channel quality indicator (CQI) selection.

BACKGROUND OF THE INVENTION

Mobile communication has changed the way people communicate and mobile phones have been transformed from a luxury item to an essential part of every day life. The use of mobile phones today is generally dictated by social situations, rather than being hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

The General Packet Radio Service (GPRS) and Enhanced Data rates for GSM (EDGE) technologies may be utilized for enhancing the data throughput of present second generation (2G) systems such as GSM. The GSM technology may support data rates of up to 14.4 kilobits per second (Kbps), while the GPRS technology may support data rates of up to 115 Kbps by allowing up to 8 data time slots per time division multiple access (TDMA) frame. The GSM technology, by contrast, may allow one data time slot per TDMA frame. The EDGE technology may support data rates of up to 384 Kbps. The EDGE technology may utilizes 8 phase shift keying (8-PSK) modulation for providing higher data rates than those that may be achieved by GPRS technology. The GPRS and EDGE technologies may be referred to as "2.5G" technologies.

The UMTS technology with theoretical data rates as high as 2 Mbps, is an adaptation of the WCDMA 3G system by GSM. One reason for the high data rates that may be achieved by UMTS technology stems from the 5 MHz WCDMA channel bandwidths versus the 200 KHz GSM channel bandwidths. The HSDPA technology is an Internet protocol (IP) based service, oriented for data communications, which adapts WCDMA to support data transfer rates on the order of 10 megabits per second (Mbits/s). Developed by the 3G Partnership Project (3GPP) group, the HSDPA technology achieves higher data rates through a plurality of methods. For example, many transmission decisions may be made at the base station level, which is much closer to the user equipment as opposed to being made at a mobile switching center or office. These may include decisions about the scheduling of data to be transmitted, when data is to be retransmitted, and assessments about the quality of the transmission channel. The HSDPA technology utilizes variable coding rates and supports 16-level quadrature amplitude modulation (16-QAM) over a high-speed downlink shared channel (HS-DSCH), which permits a plurality of users to share an air interface channel In some instances, HSDPA may provide a two-fold improvement in network capacity as well as data speeds up to five times (over 10 Mbit/s) higher than those in even the most advanced 3G networks. HSDPA may also shorten the roundtrip time between network and terminal, while reducing variances in downlink transmission delay. These performance advances may translate directly into improved network performance and higher subscriber satisfaction. Since HSDPA is an extension of the GSM family, it also builds directly on the economies of scale offered by the world's most popular mobile technology. HSDPA may offer breakthrough advances in WCDMA network packet data capacity, enhanced spectral and radio access networks (RAN) hardware efficiencies, and streamlined network implementations. Those improvements may directly translate into lower cost-per-bit, faster and more available services, and a network that is positioned to compete more effectively in the data-centric markets of the future.

The capacity, quality and cost/performance advantages of HSDPA yield measurable benefits for network operators, and, in turn, their subscribers. For operators, this backwards-compatible upgrade to current WCDMA networks is a logical and cost-efficient next step in network evolution. When deployed, HSDPA may co-exist on the same carrier as the current WCDMA Release 99 services, allowing operators to introduce greater capacity and higher data speeds into existing WCDMA networks. Operators may leverage this solution to support a considerably higher number of high data rate users on a single radio carrier. HSDPA makes true mass-market mobile IP multimedia possible and will drive the consumption of data-heavy services while at the same time reducing the cost-per-bit of service delivery, thus boosting both revenue and bottom-line network profits. For data-hungry mobile subscribers, the performance advantages of HSDPA may translate into shorter service response times, less delay and faster perceived connections. Users may also download packet-data over HSDPA while conducting a simultaneous speech call.

HSDPA may provide a number of significant performance improvements when compared to previous or alternative technologies. For example, HSDPA extends the WCDMA bit rates up to 10 Mbps, achieving higher theoretical peak rates with higher-order modulation (16-QAM) and with adaptive coding and modulation schemes. The maximum QPSK bit rate is 5.3 Mbit/s and 10.7 Mbit/s with 16-QAM. Theoretical bit rates of up to 14.4 Mbit/s may be achieved with no channel coding. The terminal capability classes range from 900 kbits/s to 1.8 Mbit/s with QPSK modulation and 3.6 Mbit/s and up with 16-QAM modulation. The highest capability class supports the maximum theoretical bit rate of 14.4 Mbit/s.

Implementing advanced wireless technologies, such as WCDMA and/or HSDPA, may still require overcoming some architectural hurdles because of the very high speed, and wide bandwidth data transfers that may be supported by such wireless technologies. For example, an HSDPA Category 8 supports 7.2 Mbit/s of peak data throughput rate. Furthermore, various antenna architectures, such as multiple-input multiple-output (MIMO) antenna architectures, as well as multipath processing receiver circuitry may be implemented within a handheld device to process the high speed HSDPA bitstream. However, the implementation of HSDPA-enabled devices that provide higher data rates and lower latency to users may result in increased power consumption, implementation complexity, mobile processor real estate, and ultimately, increased handheld device size.

However, the widespread deployment of multi-antenna systems in wireless communications, particularly in wireless handset devices, has been limited by the increased cost that results from increased size, complexity, and power consumption. Providing a separate RF chain for each transmit and receive antenna is a direct factor that increases the cost of multi-antenna systems. As the number of transmit and receive antennas increases, the system complexity, power consumption, and overall cost may increase. In addition, conventional methods of signal processing at the receiver side of a wireless communication system do not take into account outside interference as well as IPI resulting within a multipath fading environment. Furthermore, conventional methods of multipath detection and noise estimation may not account for changing channel conditions in order to maximize the wireless system performance. This poses problems for mobile system designs and applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or apparatus for adaptive noise and/or signal filtering in an HSDPA channel quality indicator (CQI) selection, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1C illustrates an exemplary table of CQI values that are arranged according to HS-PDSCH subframe parameters, which may be used in accordance with an embodiment of the invention.

DETAILED DESCRIPTION OF THE INVENTION

Certain embodiments of the invention may be found in a method and/or apparatus for adaptive noise and/or signal filtering in an HSDPA channel quality indicator (CQI) selection. Aspects of the method may include estimating at a receiver, a rate at which a communication channel changes. A length of a filter used to average a noise power estimate and/or a signal amplitude estimate may be adaptively changed based on the estimation of the rate at which the communication channel changes. The communication channel may comprise a common pilot channel (CPICH). At least a portion of a wireless signal received via the communication channel may be descrambled at the receiver to generate a plurality of descrambled bits. At least a portion of the plurality of descrambled bits may be accumulated to generate at least one in-phase (I) component and at least one quadrature (Q) component. The noise power estimate and the signal amplitude estimate may be generated based on the at least one I component and the at least one Q component. The noise power estimate and the signal amplitude estimate may be scaled to generate a scaled noise power estimate and a scaled signal amplitude estimate. The scaled noise power estimate and the scaled signal amplitude estimate may be averaged using the filter, and the scaled averaged signal amplitude estimate may be squared to generate an average noise power estimate and an average signal power estimate. A CPICH SNR value may be generated for the communication channel, based on the average noise power estimate and the average signal power estimate. An HS-DSCH SNR value may be generated for the communication channel, based on the CPICH SNR value. A channel quality indicator (CQI) value may be generated for the communication channel, based on the HS-DSCH SNR value.

Figure 1A:
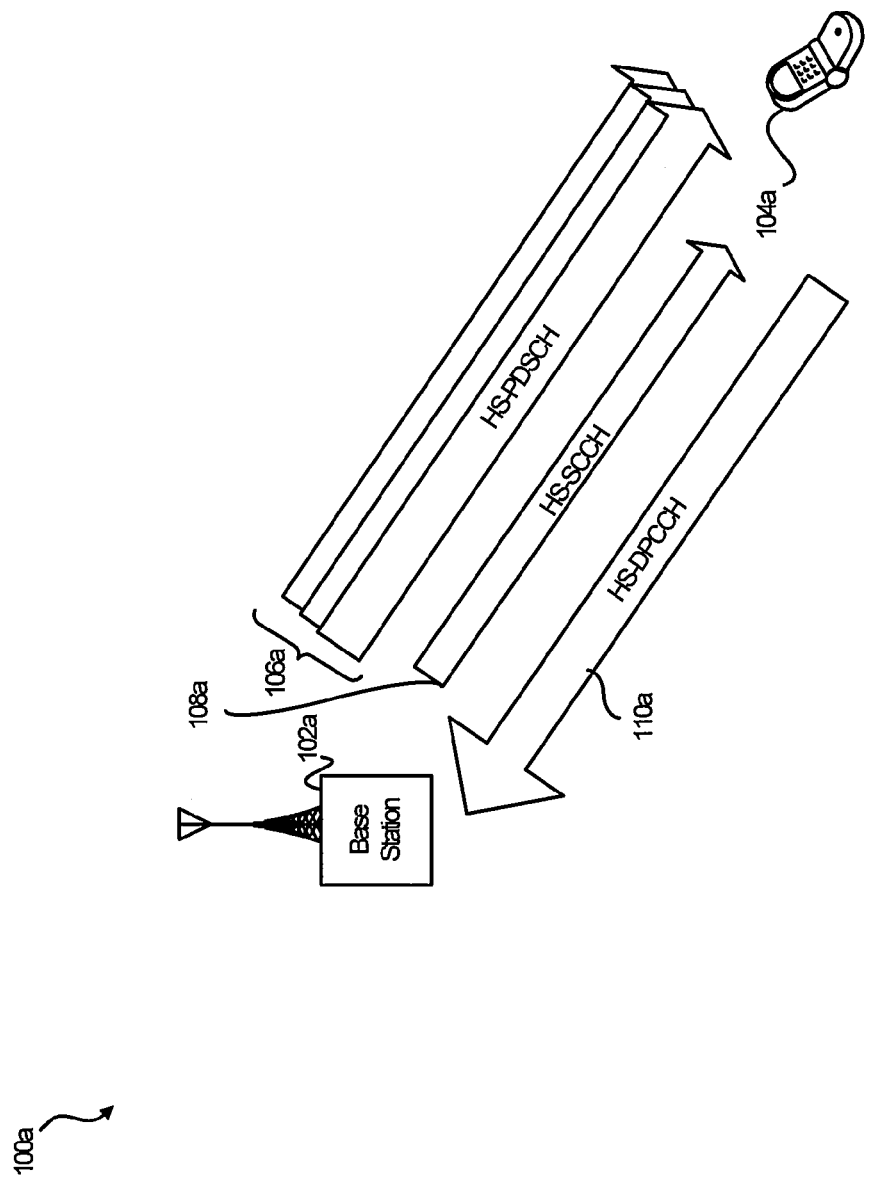
FIG. 1A is a diagram illustrating an exemplary HSDPA channel structure, which may be utilized in connection with an embodiment of the invention.

FIG. 1A is a diagram illustrating an exemplary HSDPA channel structure, which may be utilized in connection with an embodiment of the invention. Referring to FIG. 1A, three channels may be used to support HSDPA connection between the base station 102a and the UE 104a. A high-speed downlink shared channel (HS-DSCH) 106a and a high speed shared control channel (HS-SCCH) 108a may be used on the downlink between the base station 102a and the UE 104a. A high-speed dedicated physical control channel (HS-DPCCH) 110a may be used on the uplink between the UE 104a and the base station 102a.

The HS-DPCCH 110a may be used as a signaling channel that carries acknowledge (ACK) and non-acknowledge (NACK) signals and measurement reports such as the CQI (channel quality indicator) value. The HS-DSCH 106a may comprise a plurality of high-speed physical downlink shared channel (HS-PDSCH) and may be used to carry user data. The HS-SCCH 108a may be used to carry exemplary control information, such as modulation, HARQ redundancy/constellation version, HARQ processor ID, new data indication, index of the transport block size, and/or user equipment (UE) identity information corresponding to the data carried in the HS-DSCH channel 106a. The UE 104a may use several physical channel-related parameters to indicate to the base station 102a its capability to support the HSDPA services.

In one embodiment of the invention, the base station 102a may be configured to transmit its signal according to a CQI value. The CQI value may define the format of a HS-PDSCH sub-frame in terms of the transport block size, number of HS-PDSCH codes and modulation, for example. A wireless receiver, such as the UE 104a, may be configured to estimate the CQI value based on the channel condition, and then feedback the estimated CQI value to the transmitter or the base station 102a via the HS-DPCCH 110a. The UE 104a may be adapted to estimate the CQI value based on noise and signal power estimation and/or a signal-to-noise ratio (SNR) for the communication channel using adaptive noise and/or signal filtering. In this regard, noise power estimation may change adaptively with respect to the channel fading rate. In instances of slow fading channels, long averaging on the noise may be performed at the receiver or UE 104a during CQI estimation to reduce noisy variance on the CQI estimate. In instances of fast fading channels, averaging over a short period of time may be performed at the receiver or UE 104a during CQI estimation to allow for fade tracking and avoid throughput lost due to inaccurate CQI estimation. In this regard, the UE 104a may switch between long and short averaging of noise power estimates and/or signal power estimates, as a function of channel Doppler or channel fading rate.

The transmitter or base station (BS) 102a may dynamically change the transmission parameters, such as modulation and/or coding rate based on the channel quality reports fed back by the receiver or UE 104a. In instances when the UE 104a feeds back a good channel quality, the BS 102a may select a transmission mode that provides high throughput. When the UE 104a feeds back a poor channel quality indicator, the BS 102a may select a more robust transmission mode that provides lesser throughput.

The UE 104a may use a link adaptation algorithm to track and estimate the varying channel condition and report it to the BS 102a. In instances when the algorithm may be determined to be too conservative, the system may be under-used and the throughput may become sub-optimal. In instances when the algorithm may be determined to be too aggressive, the system may be over-used and the throughput may again become sub-optimal because of too many error occurrences. In one embodiment of the invention, the UE 104a may estimate the channel condition by computing the SNR of the received signal. The SNR may correspond to the ratio of the signal power component to the noise power component. A high SNR may indicate a good channel condition, and a low SNR may indicate a bad channel condition. In instances where it may be determined that the channel may be changing very slowly, such as when the channel is static or when the Doppler fading rate is low, the UE 104a may perform a long averaging on the signal and noise component to improve the accuracy of the SNR estimate. However, in instances where it may be determined that the channel may be changing rapidly, such as when the Doppler fading rate is high, a shorter averaging may be performed so that the SNR estimate may track the fading rate appropriately. In this regard, the UE 104a may adapt the averaging length of the noise and/or signal component as a function of the channel fading rate, thereby providing an accurate SNR estimation method for a wide range of channel conditions.

Figure 1B:
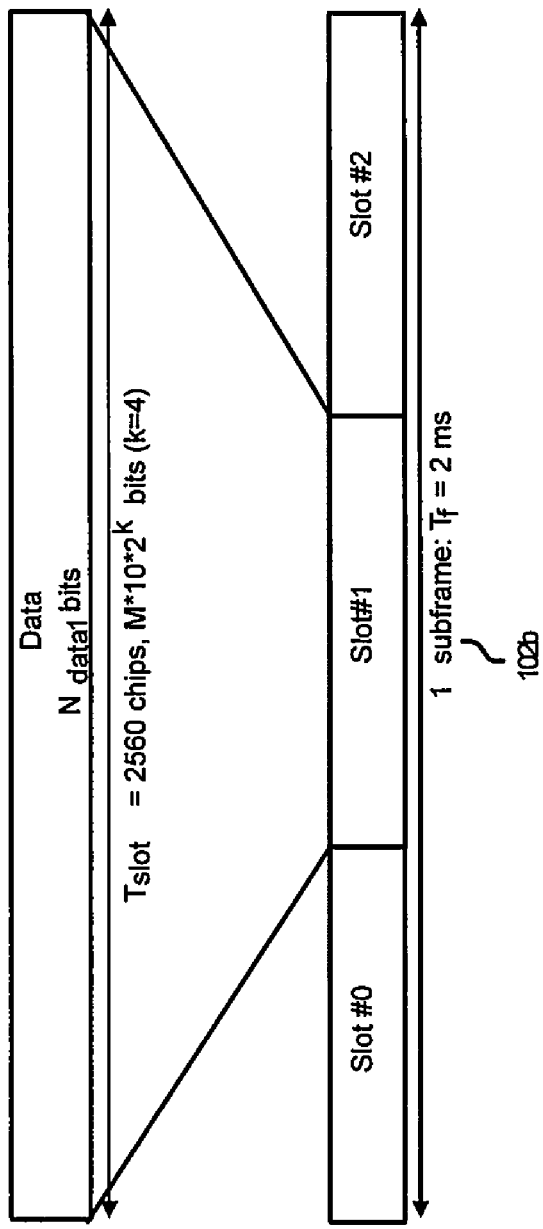
FIG. 1B is a diagram illustrating an exemplary HS-PDSCH subframe structure, which may be used in accordance with an embodiment of the invention.

FIG. 1B is a diagram illustrating an exemplary HS-PDSCH subframe structure, which may be used in accordance with an embodiment of the invention. Referring to FIG. 1B, the HS-PDSCH subframe 102b may comprise three slots. The HS-PDSCH may correspond to one channelization code of fixed spreading factor SF=16 from the set of channelization codes reserved for HS-DSCH transmission. Multi-code transmission may also be performed, which may result in the UE being assigned multiple channelization codes in the same HS-PDSCH subframe, depending on the UE capability or the channel condition. The HS-PDSCH may use QPSK or 16QAM modulation symbols, as illustrated in FIG. 1B, where M may indicate the number of bits per modulation symbols so that M=2 for QPSK and M=4 for 16QAM.

The HS-PDSCH subframe 102b may be defined by a set of parameters, such as a transport block size, a number of HS-PDSCH channelization codes, and type of modulation. One set of parameters may be characterized by one CQI value, as illustrated by Table 100c in FIG. 1C. The CQI is a channel quality indicator, which may be sent on the uplink, from a UE to a base station, to indicate to the base station a recommended transport format and rate combination (TFRC) as well as a multi-code number. The UE may estimate the channel condition periodically and may report a corresponding CQI value to the base station. The base station may use the CQI to adapt the format of its transmission. The reported CQI may correspond to an instantaneous radio condition that may represent 3-slot time duration, such as 2 ms, ending 1-slot prior to the transmitted CQI. The CQI may also indicate the transmission mode with the highest throughput for a given channel condition, while remaining within block error rate (BLER) constraints. The SNR at the output of a UE despreader processing the received code set may be used as the primary determinant of the HS-DSCH link performance. Notwithstanding, the invention may not be so limited, and other criteria may also be utilized.

Figure 2A:
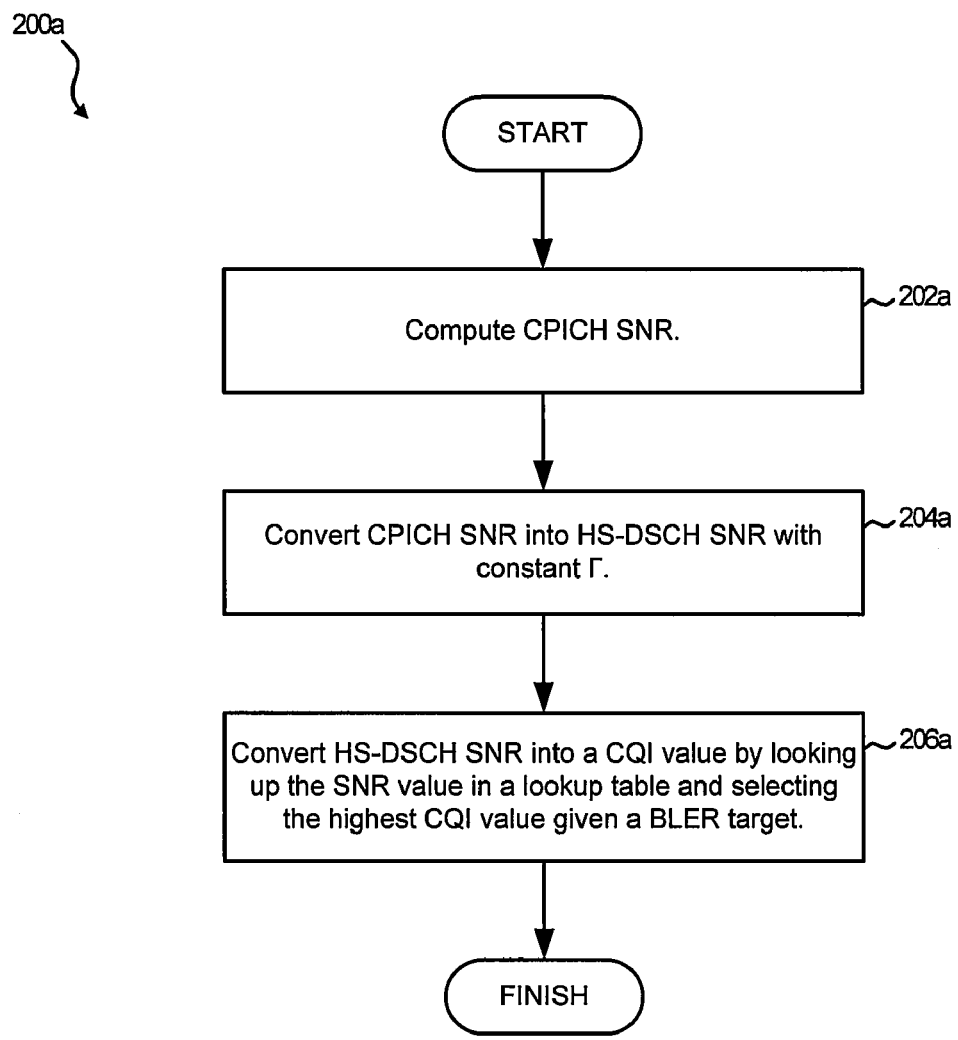
FIG. 2A is a flow diagram illustrating exemplary steps for CQI value computation, in accordance with an embodiment of the invention.

FIG. 2A is a flow diagram illustrating exemplary steps for CQI value computation, in accordance with an embodiment of the invention. Referring to FIGS. 1A and 2A, at 202a, the UE 104a may compute a CPICH SNR value. At 204a, the UE 104a may convert the CPICH SNR value into a HS-DSCH SNR value using a constant F, for example. The HS-DSCH SNR estimate may be obtained by first computing the CPICH SNR and then scaling it by the constant F. The constant F may correspond to the offset between CPICH power allocation and HS-DSCH power allocation. The constant $\Gamma$ may be a known constant and may be periodically updated and signaled by higher-layers. At 206a, the UE 104a may convert HS-DSCH SNR into a CQI value by, for example, looking up the SNR value in a lookup table and selecting the highest CQI value given a BLER target. The mapping of SNR into BLER for each CQI value may be computed a priori by using, for example, simulations. A BLER curve may be simulated for each CQI value for a single transmission, under AWGN channel condition, and may be obtained as illustrated in FIG. 2B.

Figure 2B:
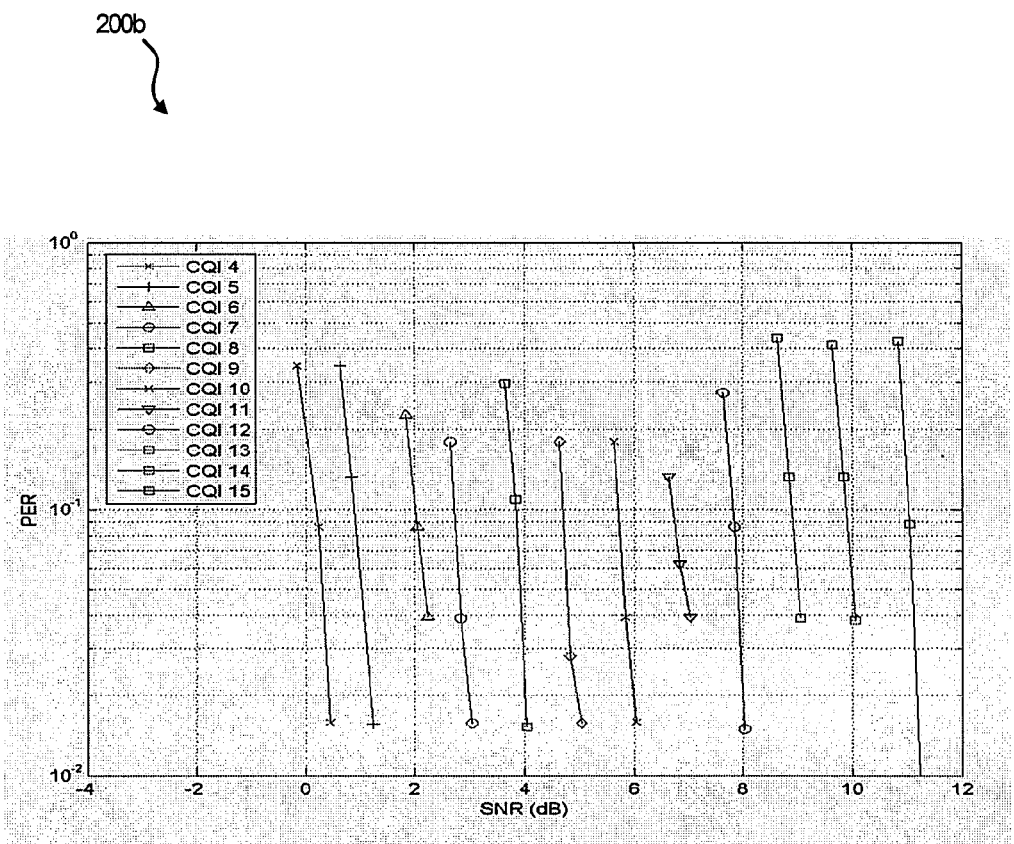
FIG. 2B is a graph which may be utilized to implement an exemplary lookup table for determining CQI values, which may be used in accordance with an embodiment of the invention.

FIG. 2B is a graph which may be utilized to implement an exemplary lookup table for determining CQI values, which may be used in accordance with an embodiment of the invention. Referring to FIG. 2B, the graph 200b, which may be utilized to implement an exemplary lookup table (LUT), may be used for the selection of the CQI value, given an HS-DSCH SNR estimate. For example, an HS-DSCH SNR value may be computed and read on the x-axis every 2 ms. The highest value of CQI with BLER≦ABLER target, such as target=10%, may be selected. For example, if HS-DSCH SNR=6.8 dB, the highest CQI value with BLER≦10% is 11. The LUT 200b may be used to calculate the instantaneous CQI under fading conditions as well.

In one embodiment of the invention, the UE 104a may use an adaptive method for estimating the CPICH SNR that changes as a function of the channel fading rate. In this regard, the averaging length of the noise and/or signal component may be adapted dynamically as a function of the channel fading rate, thereby providing an accurate SNR estimation method for a wide range of channel conditions. This may result in improved CQI value estimation and, consequently, improved throughput, for a wide range of channel fading rates.

Figure 3:
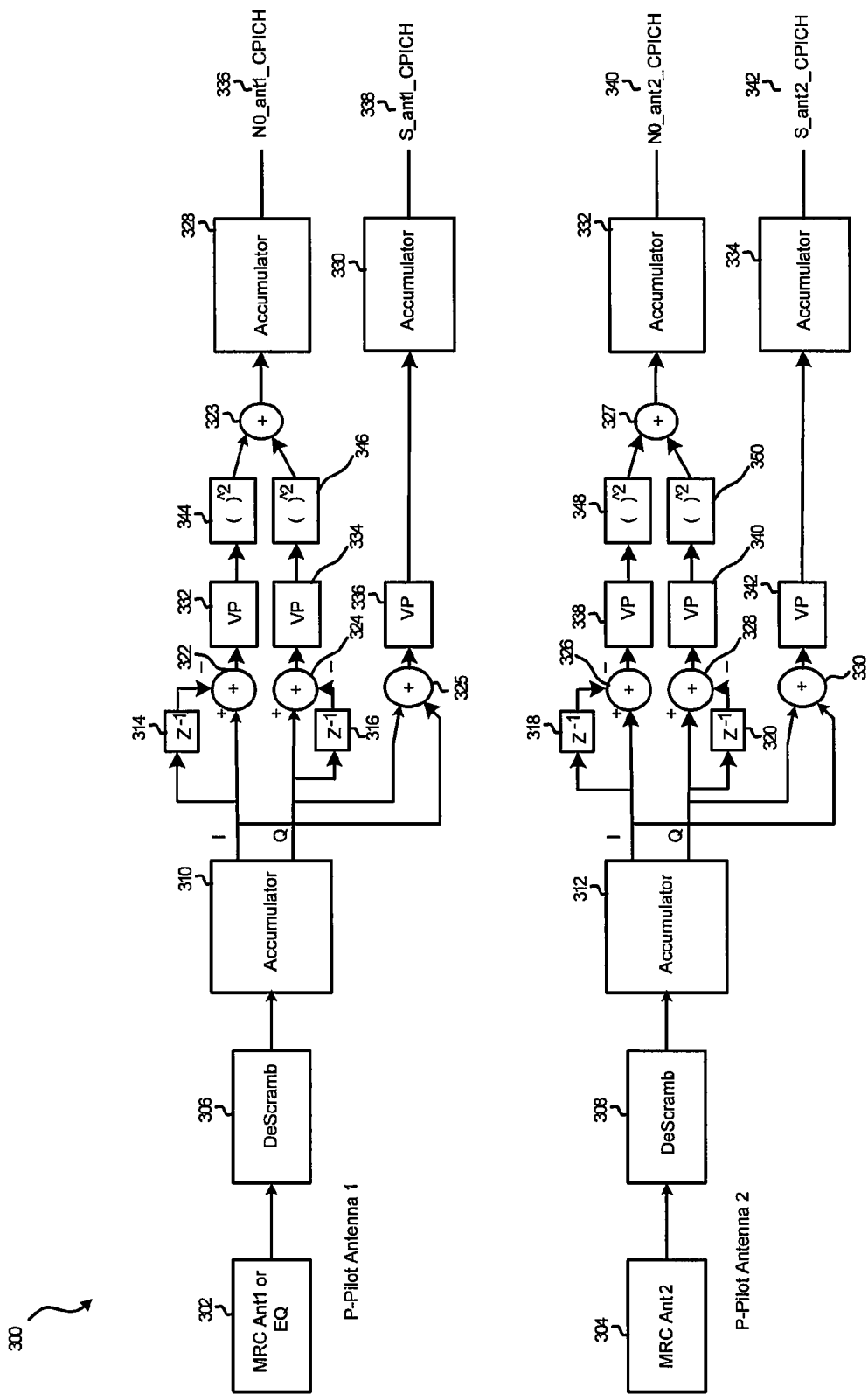
FIG. 3 is a block diagram of an exemplary system for generating a noise power estimate and a signal power estimate, in accordance with an embodiment of the invention.

FIG. 3 is a block diagram of an exemplary system for generating a noise power estimate and a signal power estimate, in accordance with an embodiment of the invention. Referring to FIG. 3, the wireless system 300 may comprise an equalizer or maximum ratio combiner (MRC) receiver blocks 302, 304, descrambler/despreader blocks 306, 308, accumulators 310, 312, and delay blocks 314, ..., 320. The wireless system 300 may also comprise adders 322, ..., 330, viewport blocks (VPs) 332, ..., 342, amplitude blocks 344, ..., 350, and accumulators 328, ..., 334.

In operation, the received wireless signal at the output of either the equalizer or the MRC receiver 302 may be initially descrambled/despread by the descrambler/despreader block 306. The output of the descrambler/despreader block 306 may be communicated to the accumulator 310. The accumulator 310 may accumulate the received signal either over 256 chips, in instances when a single Tx antenna is used by the wireless system 300, or over 512 chips, in instances when transmit diversity is used with more than one active antennas. The accumulator 310 may then generate an in-phase (I) component and a quadrature (Q) component signals. The I and Q signals at the output of the accumulator 310 may then be added together by the adder 325. The added signal may be scaled by a viewport block 336 and added by the accumulator 330. In instances when a single Tx antenna is used, the accumulator 330 may add the scaled signal over 10 symbols, for example. In instances when transmit diversity is used, the accumulator 330 may add the scaled signal over 5 symbols to yield a signal amplitude estimate, s_ant1_CPICH 338, which may be updated once per slot.

The I and Q signal at the output of the accumulator 310 may be also delayed by delay blocks 314, 316 and subtracted across 2 contiguous symbols using the adders 322, 324. The result of the subtraction may then be scaled by the viewport blocks 332, 334. The scaled signals may be squared by the amplitude blocks 344, 346, and added by the accumulator 328 over 10 symbols, in instances when a single Tx antenna is used by the wireless system 300, or over 5 symbols, in instances when transmit diversity is used in the wireless system 300. The accumulator 328 may generate a noise power estimate, N0_ant1_CPICH 336, which may be updated once per slot.

In one embodiment of the invention, the wireless system 300 may use transmit diversity and the received signal from Tx antenna 2 may be processed in parallel with antenna 1 to yield a signal amplitude estimate S_ant2_CPICH 342 and a noise power estimate N0_ant2_CPICH 340. The generated noise power estimates 336 and 340, as well as the signal amplitude estimates 338 and 342 may be further processed using an adaptive length filter with dynamically controlled length to generate a CQI estimate.

Figure 4:
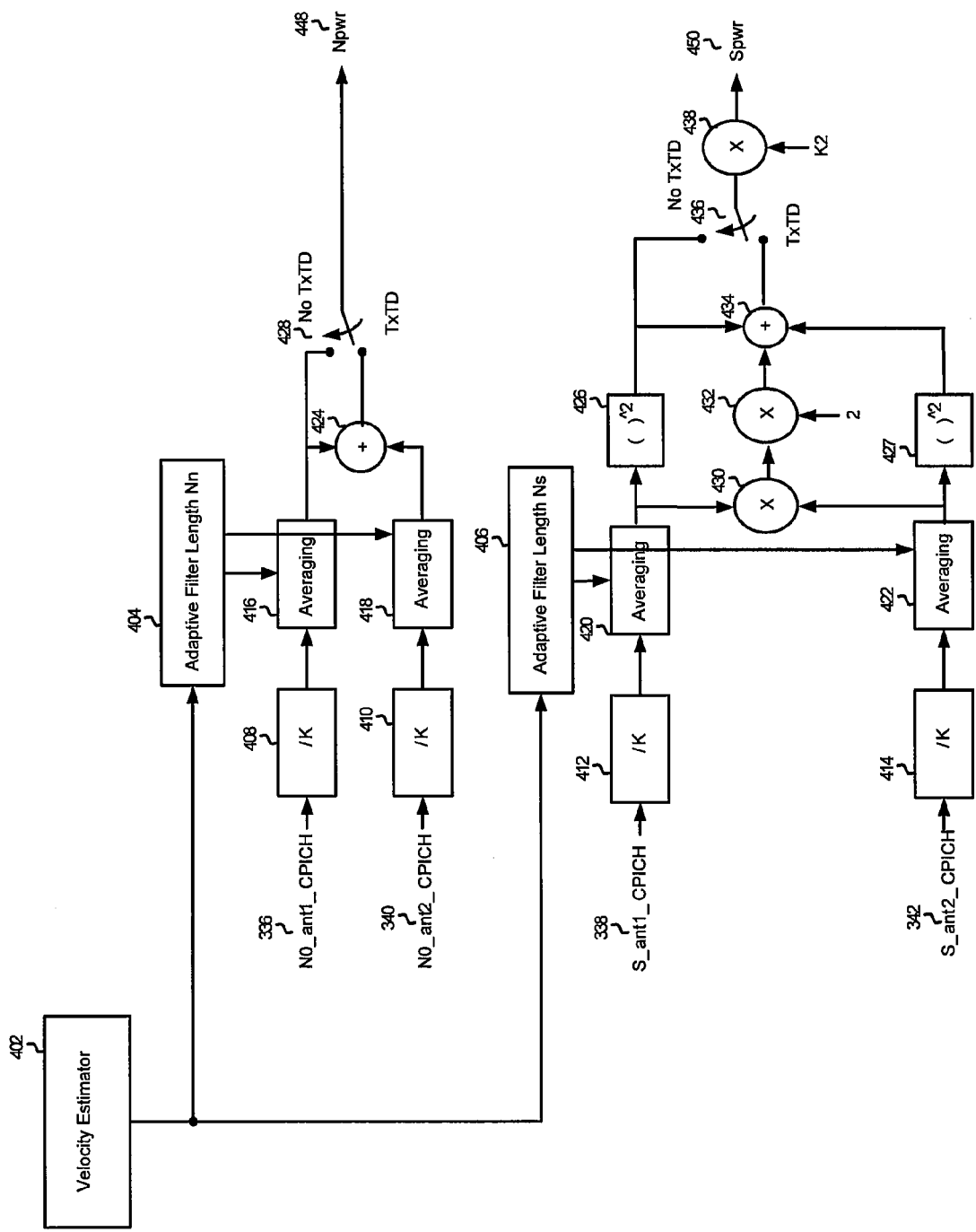
FIG. 4 is a block diagram of an exemplary system for averaging a noise power estimate and a signal power estimate using an adaptive length filter, in accordance with an embodiment of the invention.

FIG. 4 is a block diagram of an exemplary system for averaging a noise power estimate and a signal amplitude estimate using an adaptive length filter, in accordance with an embodiment of the invention. Referring to FIG. 4, the exemplary system for averaging a noise power estimate and a signal amplitude estimate may comprise a velocity estimator block 402, scaling blocks 408, ..., 414, adaptive length calculating blocks 404, 406, and averaging filters 416, ..., 422. The exemplary system for averaging a noise power estimate and a signal amplitude estimate may also comprise adders 424, 434, squaring blocks 426, 427, switches 428, 436, and multipliers 430, 432, 438.

The velocity estimator block 402 may comprise suitable circuitry, logic and/or code and may be adapted to estimate the Doppler of the channel and/or how fast the communication channel is changing or fading. The velocity estimate may then be communicated to the adaptive length calculating blocks 404, 406. The adaptive length calculating blocks 404, 406 may comprise suitable circuitry, logic and/or code and may be adapted to calculate the length of the averaging filters 416, ..., 422 based on the velocity estimate received from the velocity estimator 402.

In operation, the slot-based noise power estimates 336, 340 may be scaled by the scaling blocks 408, 410 using a scaling factor K. The scaling factor K may be based on hardware implementation, for example. The scaled noise power estimates may then be filtered by the averaging filters 416, 418. The filters 416, 418 may be implemented as a sliding window or as a tap delay line of length Nn, or as an infinite impulse response (IIR) filter of length equivalent to Nn. A forgetting factor in the IIR filter may be selected to match the length Nn. The filtered estimates may be added by the adder 424, in instances when transmit diversity is used. In this regard, the switch 428 may be used to switch and activate the adder 424 in instances when transmit diversity is used. The final noise power estimate 448 may be used for estimating the CQI value.

As stated herein, the term "forgetting factor" may be utilized to describe an IIR filter. In some instances, a new sample that enters the filter may be given more weight than previous, older samples. For example:

$$xk=(xk-1)+0.5*x(k-2)+0.25*x(k-3)+0.125*x(k4)+\text{etc.}$$
...

In this regard, older samples may each be scaled by a decreasing scaling factor, so that the filter may tend to "forget" older samples. The forgetting factor may then be used as a weighted average.

In one embodiment of the invention, the averaging length parameter Nn may be changed dynamically as a function of the output of the velocity estimator block 402. If the velocity estimator block 402 estimates slow-changing conditions, Nn may be selected to average over a long period of time, such as 15 slots or more, for example. If the velocity estimator block 402 estimates fast-changing conditions, Nn may be selected to average over a short period of time, such as 3 slots, for example. By dynamically changing the filter length as a function of the Doppler or how fast the channel is changing or fading, the filters 416, 418 may be optimized to yield an optimal noise estimate for a wide range of channel conditions.

A similar mechanism may be applied to the signal amplitude estimates 338, 342, by controlling the averaging length parameter Ns. In instances when transmit diversity is used, the filtered signal amplitude estimates generated by the averaging filters 420, 422 may be squared by the squaring blocks 426, 427 to yield signal power estimates, scaled by the multipliers 430, 432, and then added by the adder 434. The signals added by the adder 434 may be multiplied again by the multiplier 438 to generate the final signal power estimate 450, which may be used for estimating the CQI value.

In another embodiment of the invention, the averaging length parameters may be selected so that Nn=Ns. In yet another embodiment of the invention, one of the parameters may be selected as a constant, for example Ns may be selected as a constant and may equal 3 slots, and dynamically control only the remaining length parameter, such as Nn.

Figure 5:
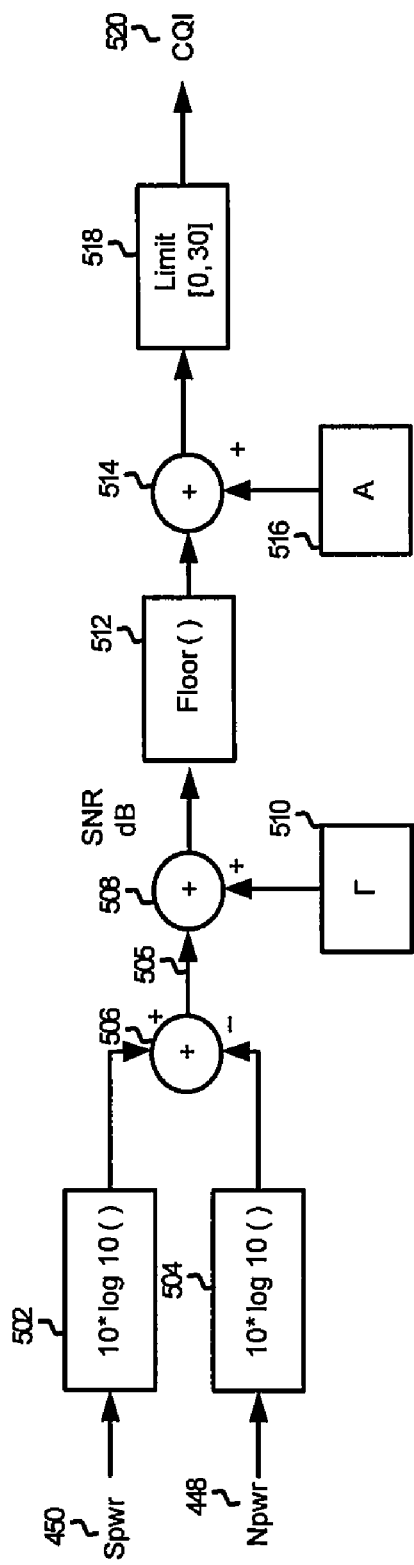
FIG. 5 is a block diagram of an exemplary system for computing CQI values, in accordance with an embodiment of the invention.

FIG. 5 is a block diagram of an exemplary system for computing CQI values, in accordance with an embodiment of the invention. Referring to FIG. 5, the CQI estimation system may comprise conversion blocks 502, 504, adders 506, 508, 514, integer flooring block 512, and a limiting block 518.

The signal power estimate Spwr 450 and the Npwr 448 may be initially converted in the dB domain by the conversion blocks 502, 504. The converted estimates may then be subtracted by the adder 506 to generate an SNR estimate 505 in the dB domain. The adder 508 may then add the constant F from block 510 to the SNR estimate 505 to convert the CPICH SNR dB into an HS-DSCH SNR dB. The integer flooring block 512 may then floor the HS-DSCH SNR dB estimate to an integer. In another embodiment of the invention, the HS-DSCH SNR dB estimate may be rounded.

The adder 514 may then add an integer A from block 516 to the integer generated by the integer flooring block 512. The integer A may be dependent on the computed lookup table shown on FIG. 2B, for example. Referring to FIG. 2B, it may be noted that if the rounded HS-DPSCH SNR is equal to 7 dB, the largest CQI value that yields a BLER≦BLER target of 10% is equal to 11. Therefore, in this instance, A=4. The value generated by the adder 514 may then be passed through a limiting block 518 so that the final CQI value estimate 520 may be within the range of [0,30], so that it is consistent with Table 100c in FIG. 1C.

Figure 6:
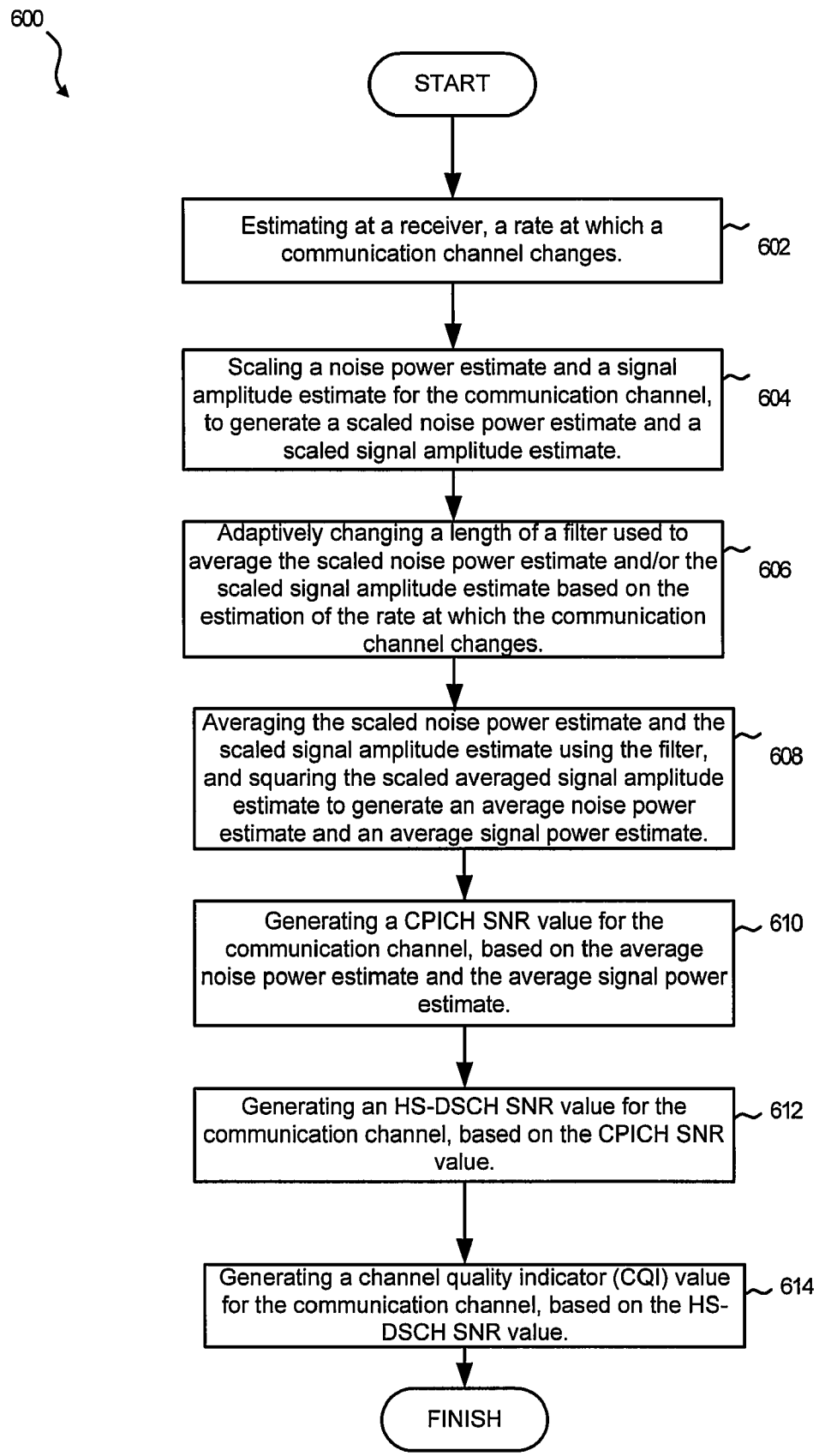
FIG. 6 is a flow diagram illustrating exemplary steps for processing signals in a wireless communication system, in accordance with an embodiment of the invention.

FIG. 6 is a flow diagram illustrating exemplary steps for processing signals in a wireless communication system, in accordance with an embodiment of the invention. Referring to FIGS. 1A and 6, at 602, the UE 104a may estimate a rate at which a communication channel changes. At 604, the UE 104a may scale a noise power estimate and a signal amplitude estimate for the communication channel, to generate a scaled noise power estimate and a scaled signal amplitude estimate. At 606, the UE 104a may adaptively change a length of a filter used to average the scaled noise power estimate and/or the scaled signal amplitude estimate, based on the estimation of the rate at which the communication channel changes. At 608, the UE 104a may average the scaled noise power estimate and the scaled signal amplitude estimate using the filter, and may square the scaled averaged signal amplitude estimate to generate an average noise power estimate and an average signal power estimate. At 610, the UE 104a may generate a CPICH SNR value for the communication channel, based on the average noise power estimate and the average signal power estimate. At 612, the UE 104a may generate an HS-DSCH SNR value for the communication channel, based on the CPICH SNR value. At 614, the UE 104a may generate a channel quality indicator (CQI) value for the communication channel, based on the HS-DSCH SNR value.

Figure 7:
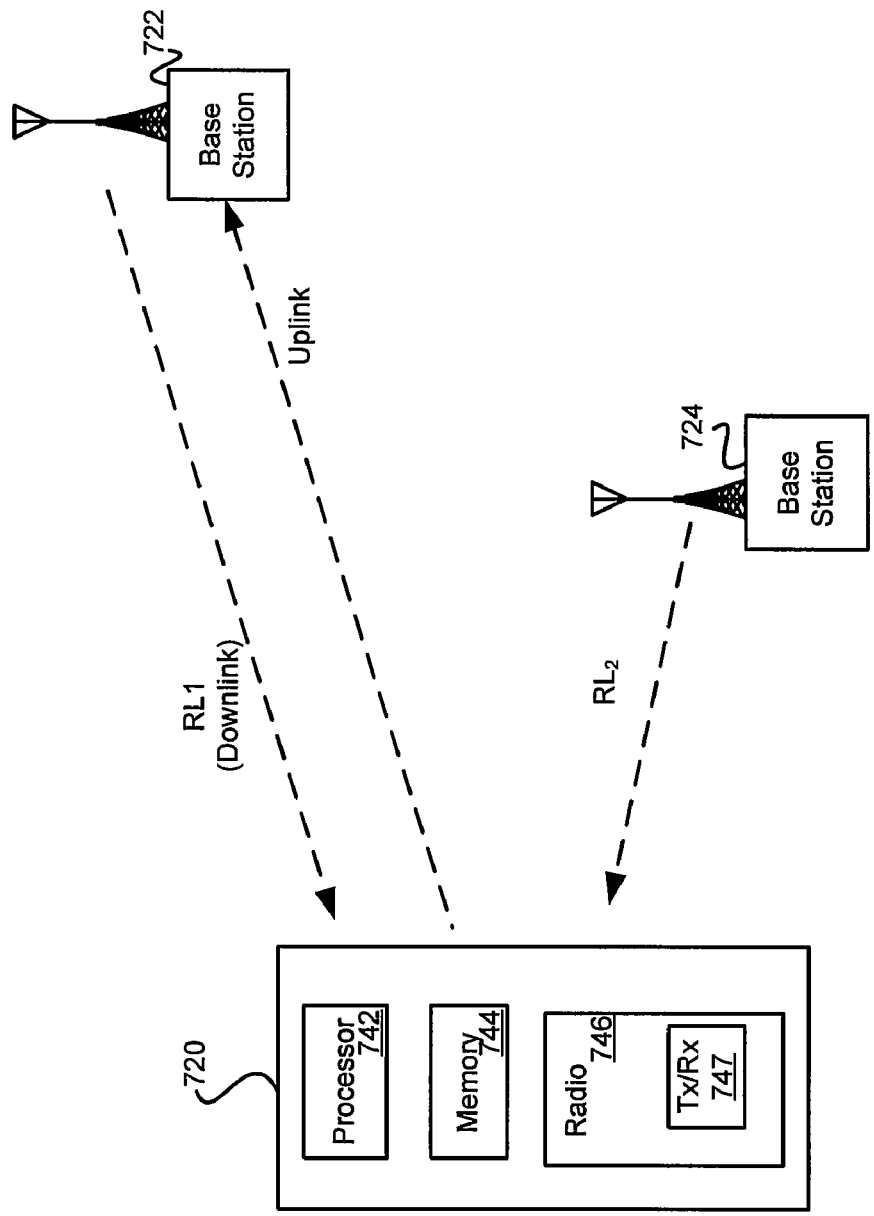
FIG. 7 is an exemplary diagram illustrating a wireless handset communicating with wireless base stations, in accordance with an embodiment of the invention.

FIG. 7 is an exemplary diagram illustrating a wireless handset communicating with wireless base stations, in accordance with an embodiment of the invention. Referring to FIG. 7, there is shown a mobile handset or user equipment 720, a plurality of base stations BS 722 and BS 724, and a plurality of radio links (RL), $RL_1$ and $RL_2$ coupling the user equipment (UE) 720 with the base stations BS 722 and BS 724, respectively. The user equipment 720 may comprise a processor 742, a memory 744, and a radio 746. The radio 746 may comprise a transceiver (Tx/Rx) 747.

In accordance with an embodiment of the invention, the processor 742 integrated within the UE 720, may enable estimation at the radio 746, a rate at which a communication channel changes. The processor 742 may adaptively change a length of a filter used to average a noise power estimate and/or a signal power estimate based on the estimation of the rate at which the communication channel changes. The communication channel may comprise a common pilot channel (CPICH). The processor 742 may enable descrambling of at least a portion of a wireless signal received via the communication channel to generate a plurality of descrambled bits. The processor 742 may enable accumulation of at least a portion of the plurality of descrambled bits to generate at least one in-phase (I) component and at least one quadrature (Q) component.

The processor 742 may enable generation of the noise power estimate and the signal amplitude estimate based on the at least one I component and the at least one Q component. The processor 742 may enable scaling of the noise power estimate and the signal amplitude estimate to generate a scaled noise power estimate and a scaled signal amplitude estimate. The processor 742 may enable averaging of the scaled noise power estimate and the scaled signal amplitude estimate using the filter, and may square the scaled averaged signal amplitude estimate to generate an average noise power estimate and an average signal power estimate. The processor 742 may enable generation of a CPICH SNR value for the communication channel, based on the average noise power estimate and the average signal power estimate. The processor 742 may enable generation of an HS-DSCH SNR value for the communication channel, based on the CPICH SNR value. The processor 742 may enable generation of a channel quality indicator (CQI) value for the communication channel, based on the HS-DSCH SNR value.

In an embodiment of the invention, a machine-readable storage may be provided, having stored thereon, a computer program having at least one code section executable by a machine, thereby causing the machine to perform the steps described herein for processing signals in a wireless communication system so as to perform adaptive noise filtering in HSDPA CQI selection.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a wireless communication system, the method comprising:
    performing by one or more processors and/or circuits integrated within a single chip:
        estimating at a receiver, a rate at which a communication channel changes; and
        adaptively changing a length of a filter used to average one or both of a noise power estimate and/or a signal amplitude estimate, based on said estimation of said rate at which said communication channel changes.

2. The method according to claim 1, wherein said communication channel comprises a common pilot channel (CPICH).

3. The method according to claim 1, comprising descrambling at said receiver, at least a portion of a wireless signal received via said communication channel to generate a plurality of descrambled bits.

4. The method according to claim 3, comprising accumulating at least a portion of said plurality of descrambled bits to generate at least one in-phase (I) component and at least one quadrature (Q) component.

5. The method according to claim 4, comprising generating said noise power estimate and said signal amplitude estimate based on said at least one I component and said at least one Q component.

6. The method according to claim 1, comprising scaling said noise power estimate and said signal amplitude estimate to generate a scaled noise power estimate and a scaled signal amplitude estimate.

7. The method according to claim 6, comprising averaging said scaled noise power estimate and said scaled signal amplitude estimate using said filter and squaring said scaled averaged signal amplitude estimate to generate an average noise power estimate and an average signal power estimate.

8. The method according to claim 7, comprising:
    generating a CPICH signal-to-noise ratio (SNR) value for said communication channel, based on said average noise power estimate and said average signal power estimate; and
    generating an high-speed downlink shared channel (HS-DSCH) SNR value for said communication channel, based on said CPICH SNR value.

9. The method according to claim 8, comprising generating a channel quality indicator (CQI) value for said communication channel, based on said HS-DSCH SNR value.

10. The method according to claim 1, wherein said filter comprises a first length, when said filter is used to average said noise power estimate, and said filter comprises a second length, when said filter is used to average said signal amplitude estimate, wherein said first length is different from said second length.

11. A system for processing signals in a wireless communication system, the system comprising:
    at least one processor integrated within a receiver that enables estimation at said receiver, a rate at which a communication channel changes; and
    said at least one processor enables adaptively changing a length of a filter used to average one or both of a noise power estimate and/or a signal amplitude estimate, based on said estimation of said rate at which said communication channel changes.

12. The system according to claim 11, wherein said communication channel comprises a CPICH.

13. The system according to claim 11, wherein said at least one processor enables descrambling of at least a portion of a wireless signal received via said communication channel to generate a plurality of descrambled bits.

14. The system according to claim 13, wherein said at least one processor enables accumulating of at least a portion of said plurality of descrambled bits to generate at least one in-phase (I) component and at least one quadrature (Q) component.

15. The system according to claim 14, wherein said at least one processor enables generation of said noise power estimate and said signal amplitude estimate based on said at least one I component and said at least one Q component.

16. The system according to claim 11, wherein said at least one processor enables scaling of said noise power estimate and said signal amplitude estimate to generate a scaled noise power estimate and a scaled signal amplitude estimate.

17. The system according to claim 16, wherein said at least one processor enables averaging of said scaled noise power estimate and said scaled signal amplitude estimate using said filter and squaring said scaled averaged signal amplitude estimate to generate an average noise power estimate and an average signal power estimate.

18. The system according to claim 17, wherein said at least one processor enables generation of a CPICH SNR value for said communication channel, based on said average noise power estimate and said average signal power estimate.

19. The system according to claim 18, wherein said at least one processor enables generation of an HS-DSCH SNR value for said communication channel, based on said CPICH SNR value.

20. The system according to claim 19, wherein said at least one processor enables generation of a CQI value for said communication channel, based on said HS-DSCH SNR value.

* * * * *